US012811055B2

(12) United States Patent
Sho et al.

(10) Patent No.: US 12,811,055 B2
(45) Date of Patent: Nov. 24, 2026

(54) INDUCTOR WITH TEMPERATURE DETECTION

(71) Applicant: EAGLERISE INTELLIGENT DEVICE CORPORATION LTD., Foshan (CN)

(72) Inventors: Kakuryo Sho, Foshan (CN); Bo Zhang, Foshan (CN); Lingling Ye, Foshan (CN)

(73) Assignee: EAGLERISE INTELLIGENT DEVICE CORPORATION LTD., Foshan (CN)

( * ) Notice: Subject to any disclaimer, the term of this patent is extended or adjusted under 35 U.S.C. 154(b) by 563 days.

(21) Appl. No.: 18/559,354

(22) PCT Filed: Oct. 15, 2021

(86) PCT No.: PCT/CN2021/124078
§ 371 (c)(1),
(2) Date: Nov. 7, 2023

(87) PCT Pub. No.: WO2022/193637
PCT Pub. Date: Sep. 22, 2022

(65) Prior Publication Data
US 2024/0234025 A1 Jul. 11, 2024

(51) Int. Cl.
*H01F 27/40* (2006.01)
*H01F 27/24* (2006.01)
(Continued)

(52) U.S. Cl.
CPC ........... *H01F 27/402* (2013.01); *H01F 27/24* (2013.01); *H01F 27/28* (2013.01); *H01F 27/29* (2013.01)

(58) Field of Classification Search
CPC ........ H01F 27/402; H01F 27/24; H01F 27/28; H01F 27/29
See application file for complete search history.

(56) References Cited

U.S. PATENT DOCUMENTS

2016/0261175 A1* 9/2016 Takamizawa .......... H02K 11/25
2017/0309393 A1* 10/2017 Jung ..................... H01F 27/327
(Continued)

FOREIGN PATENT DOCUMENTS

CN 107004497 A 8/2017
CN 206726936 U * 12/2017
CN 111157129 A * 5/2020 ............... G01K 1/16

OTHER PUBLICATIONS

English Translation of the ISR Dec. 9, 2021 (Year: 2021).*
(Continued)

*Primary Examiner* — Malcolm Barnes

(57) ABSTRACT

Provided is an inductor with temperature detection. The inductor comprises a magnetic core, a coil and a temperature sensor; the magnetic core is provided with two winding portions, and at least one of the winding portions is provided with a recess; the coil is wound on the winding portions, and an expansion channel is formed between an inner side face of the coil and the recess on the winding portions; and the temperature sensor comprises a sensing portion and a lead wire, and the temperature sensor is arranged in the expansion channel, wherein the sensing portion is in contact with an inner side face of the coil and is used for sensing the temperature of the coil so as to generate a temperature signal, and the lead wire is connected to the sensing portion, is distributed along the extension channel and is used for outputting the temperature signal.

10 Claims, 3 Drawing Sheets

(51) Int. Cl.
*H01F 27/28* (2006.01)
*H01F 27/29* (2006.01)

(56) References Cited

U.S. PATENT DOCUMENTS

2017/0352476 A1* 12/2017 Inaba .................... H01F 27/324
2019/0372435 A1* 12/2019 Song ...................... H02K 11/25

OTHER PUBLICATIONS

English Translation of International Preliminary Report on Patentability Chapter I Dec. 4, 2023 (Year: 2023).*
International Search Report of PCT Patent Application No. PCT/CN2021/124078 issued on Jun. 27, 2022.

* cited by examiner

INDUCTOR WITH TEMPERATURE DETECTION

FIELD OF THE INVENTION

The present application relates to the technical field of inductors, in particular to an inductor with temperature detection.

BACKGROUND OF THE INVENTION

In designing of a high-power integrally formed inductor, to achieve good heat dissipation of an inductor coil, the outer surface of the inductor coil may be completely exposed, or heat dissipation may be implemented in an oil-cooling manner, or by closely fitting the bottom or a lateral side of the coil to a water-cooling plate, or by filling a high thermal conductivity glue. These are all extremely important heat dissipation design methods. When the high-power inductor is in operation, heat generation by the inductor coil and an internal magnetic core causes the overall temperature of the inductor to rise. In order to accurately detect and control the operating temperature of the inductor, it also needs to mount a temperature sensing device such as a thermistor on the surface of the inductor coil to achieve temperature detection of the inductor coil.

In order to accurately measure the temperature on the surface of the inductor coil, the temperature sensor mounted must be closely fitted to a heat generating part of the surface of the coil. However, in practical applications, the inductor coil is formed by enameled copper wires wound in multiple turns side by side, so there are uneven recesses between the copper wires on the surface of the coil, and there is an air gap between contact surfaces of the conventional temperature sensor and the coil surface. To achieve a good heat conduction effect between the sensor and the surface of the coil under temperature sensing, a gap material with high thermal conductivity, such as a thermally conductive silicone sheet, needs to be filled between the temperature sensor and the surface of the coil. Currently, there are still some problems in the assembly of the temperature sensor and the inductor coil, which may lead to inaccurate temperature sensing, and the use of too much thermally conductive material increases the process difficulty and manufacturing cost.

In some application situations, such as new energy vehicle or other vehicle application scenarios, the temperature sensor mounted must also have good resistance to mechanical shock and vibration; and even in scenarios with oil-cooling applications, the temperature sensor, a thermally conductive silicone pad and various other materials must also have long-term resistance to ATF corrosion. For this reason, the temperature sensor mounted on the coil surface needs a complex and high-cost bracket mounting structure, which makes the high-power inductor structurally more complex.

SUMMARY OF THE INVENTION

Technical Problem

A technical problem to be solved mainly by the present application is: how to improve the detection accuracy and detection reliability of a temperature sensor in an inductor.

Solution

To solve the above-mentioned technical problem, the present application provides an inductor with temperature detection.

In an embodiment, an inductor with temperature detection comprises a magnetic core, coils and a temperature sensor, wherein the magnetic core is a ring-like structure and is provided with two winding parts, at least one of the winding parts being provided with a groove; the coils are wound on the winding parts, and an extension channel is formed between an inner side face of the coil and the groove on the winding part; the temperature sensor comprises a sensing part and a lead, the temperature sensor being arranged in the extension channel; wherein the sensing part is in contact with the inner side face of the coil to sense the temperature of the coil to generate a temperature signal; and the lead is connected to the sensing part and arranged along the extension channel to output the temperature signal.

The inductor further comprises a sensor base, wherein the sensor base is located in the extension channel, and the surface of the sensor base is provided with a recess; and a portion of the sensing part is clamped in the recess, while the other portion of the sensing part is exposed from the recess and is in contact with the inner side face of the coil.

One side of the sensor base is provided with a conduit or an open port leading to the recess, and the lead is connected through the conduit or the open port to the sensing part in the recess; and the width of the conduit or the open port is less than the width of the recess to avoid escaping of the sensing part from the conduit or the open port.

The inductor further comprises a terminal block and an elastic plate, wherein the terminal block is arranged at an entrance of the extension channel; one end of the elastic plate is connected to the terminal block, and the other end of the elastic is connected to the sensor base; and the elastic plate is configured to adjust, by deformation thereof, the position of the sensor base relative to the inner side face of the coil so that the sensor base provides a pressure for the sensing part to be always in contact with the inner side face of the coil.

The terminal block is provided with at least one lead terminal; the lead is arranged on the surface of the elastic plate, and extends along the elastic plate to the terminal block, and the lead is connected to the lead terminal; and the lead terminal is configured to connect an external signal line to transmit the temperature signal to the signal line.

The inductor further comprises an external block, the external block being provided with at least one external terminal configured to connect the signal line; and the external block is detachably connected to the terminal block, and the external terminal is electrically connected to the lead terminal.

The magnetic core comprises two first components and a plurality of second components; the two first components are arranged opposite each other, and the two second components are arranged in two rows side by side between the two first components, and all of the first and second components are combined to form the ring-like structure of the magnetic core; and outer side faces of the second components are used as the winding parts.

The inductor further comprises a plurality of fixing brackets, wherein the fixing brackets are fixed around the first components; each fixing bracket is provided with clamping components, the inner sides of which clamp the second components and the outer sides of which carry the coils; and the terminal block is fixed to the fixing bracket, and the elastic plate extends from the terminal block into the extension channel.

The fixing bracket is provided with at least one hole, and the terminal block is provided with at least one pin; and the pin is in transition fit with the hole so that the terminal block is fixed to the fixing bracket.

The inductor further comprises an injection molded body, wherein injection gaps are formed between the inner side faces of the coils and the outer side faces of the second components, the injection gaps being communicated with the extension channel; and the injection molded body extends along the extension channel to the surrounding injection gaps and fills the extension channel and the injection gaps.

The injection molded body wraps the first components, and assembly parts are formed at the peripheries of the first components; and the assembly parts are configured to mount and fix an integrated molded body composed of the injection molded body, the magnetic core and the coil.

The assembly part is provided with flat wires, which are connected to terminals at the tails of the coils to introduce or draw DC power to or from the coils.

Beneficial Effects

The present application has the following beneficial effects:

An inductor with temperature detection according to the above embodiment comprises a magnetic core, coils and a temperature sensor, wherein the magnetic core is a ring-like structure and is provided with two winding parts, at least one of the winding parts being provided with a groove; the coils are wound on the winding parts, and an extension channel is formed between an inner side face of the coil and the groove on the winding part; the temperature sensor comprises a sensing part and a lead, the temperature sensor being arranged in the extension channel; wherein the sensing part is in contact with the inner side face of the coil to sense the temperature of the coil to generate a temperature signal; and the lead is connected to the sensing part and arranged along the extension channel to output the temperature signal. On the one hand, the technical solution proposes a mode of arranging the temperature sensor inside the inductor, so that the temperature sensor not only can accurately measure the temperature of the inductor coil, but also has the properties of resistance to high-intensity mechanical vibration and shock and excellent oil resistance, thereby effectively controlling the comprehensive cost of fixing and mounting the temperature sensor on the inductor; on the other hand, the technical solution uses a built-in mode for placing the sensor element inside the inductor and bringing it into close contact with the inner side face of the coil, which greatly improves the accuracy of temperature measurement, and allows the sensor to be stably contained therein by an integrally injection molding process, thus achieving the positive effects of a low cost, high reliability, high accuracy, fast response and high product quality.

DETAILED DESCRIPTION OF THE EMBODIMENTS

Figure 1:
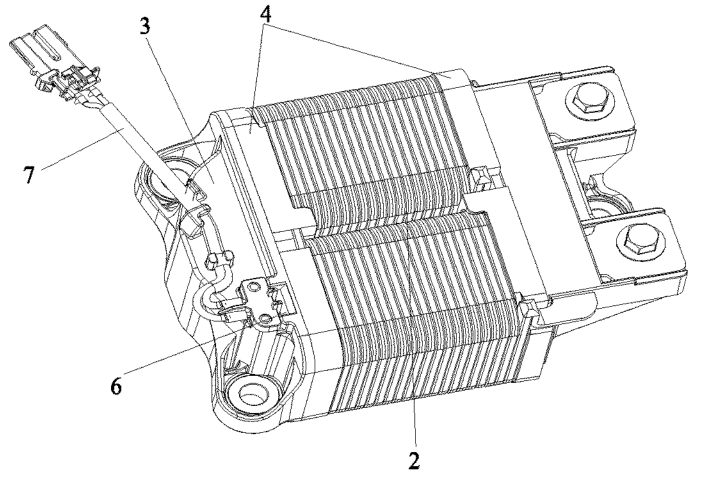
FIG. 1 an overall structure diagram of an inductor with temperature detection in an embodiment of the present application.

The present application is further described below in detail using specific implementations in conjunction the drawings. Like elements in different implementations are denoted by like element numerals associated therewith. In the following implementations, many details are described to enable the present application to be better understood. However, those skilled in the art can effortlessly recognize that some features can be omitted in various cases or can be replaced by other elements, materials or methods. In some cases, some operations related to the present application are not shown or described in the specification, to avoid that the core part of the present application is submerged by excessive description. For those skilled in the art, it is not necessary to describe the related operations in detail, and they can fully understand the related operations based on description in the specification and general technical knowledge of the art.

In addition, features, operations or characteristics described in the specification can be combined in any suitable manner to form various implementations. Moreover, steps or actions in method description can be exchanged or adjusted in order as would be apparent to those skilled in the art. Accordingly, various sequences in the specification and accompanying drawings are only intended to clearly describe an embodiment and are not meant to be mandatory sequences, unless it is otherwise stated that a sequence must be followed.

Serial numbers themselves, such as “first”, “second”, etc., for components herein are used merely to distinguish objects described, and do not have any sequential or technical meanings. The words “connection” and “coupling” in the present application include direct and indirect connection (coupling), unless otherwise specified.

Referring to FIGS. 1 to 6, disclosed in this embodiment is an inductor with temperature detection, which mainly includes a magnetic core 1, coils 2 and a temperature sensor 5, as described separately below.

The magnetic core 1 is a ring-like structure, which is provided with two winding parts, at least one of the winding parts being provided with a groove. The ring-like structure of the magnetic core 1 may be a closed ring, and may also be an incompletely closed ring formed by multiple components spliced together; to facilitate winding on the winding parts, at least one component required for splicing is preferably used to form a winding part. In addition, since each winding part needs to be wrapped with a coil 2, and an electromagnetic loop needs to be generated by the magnetic core 1 when coils 2 are energized, preferably the winding parts are provided on two opposite sides of the ring-like structure, respectively, so that the generated electromagnetic loop can be uniformly distributed.

At least two coils 2 are provided, e.g. flat-wire vertically winding coils. Each coil 2 is wound on a winding part, and thus an extension channel can be formed between an inner side face of the coil 2 and the groove on the winding part. The extension channel functions to assemble the temperature sensor 5. Of course, in some cases, as the magnetic core 1 and the coil 2 need to form an integrated molded body with an injection material, the extension channel here can also be used to fill a high-temperature plastic melt (e.g. a high-temperature fluid melt of engineering plastic like PPS; and e.g. PET, epoxy resin, nylon, etc.).

The temperature sensor 5 may be a heat-sensitive sensing component (such as an NTC-type thermistor) to sense temperature changes, which may include a sensing part 51 and a lead 52. Here, the temperature sensor 5 is arranged in the extension channel, wherein the sensing part 51 is in contact with the inner side face of the coil 2 to sense the temperature of the coil 2 to generate a temperature signal; and the lead 52 is connected to the sensing part 51 and arranged along the extension channel to output the temperature signal generated by the sensing part 51.

It is to be noted that the temperature sensor 5 may be a spherical encapsulated thermistor temperature sensor element, and its sensing part 51 may be spherical, may also be non-circular or elliptic, and may even be square, trapezoidal, etc.

In an embodiment, for the two winding parts provided on the magnetic core 1, the groove on the winding part extends toward at least one of two ends of the winding part, and the groove extends beyond the coverage of the coil on the winding part. This has two advantages: on the one hand, it facilitates insertion of the temperature sensor into the extension channel between the coil and the winding part, along the groove, and on the other hand, it also facilitates smooth entry of the high-temperature plastic melt into the extension channel along the groove beyond the coverage during injection molding. It may be appreciated that in general, the groove on the winding part only needs to have a width and a depth that allow assembly of the temperature sensor 5; for example, the groove may extend vertically or in a curved manner on the winding part, and the cross section of the groove is trapezoidal, arc-shaped or square; however, if injection molding is also considered for the groove, the groove also needs to meet certain width and depth requirements for smooth injection molding.

It is to be noted that the groove on the winding part inevitably changes the cross-sectional shape of the magnetic core, which will have an effect on the flux density on the magnetic core. In order not to obviously change the inductance characteristics and flux density of the inductor, the depth and width of the groove can be defined to ensure that the cross section of the groove is as small as possible, and also to ensure that injection molding can be implemented under a small injection pressure. For example, the depth of the groove is set in the range of 1 to 5 mm, the width of the groove is set in the range of 3 to 15 mm, and in any cross section of the winding part, a preset percentage of the cross-sectional area of the winding part is greater than the cross-sectional area of all grooves.

Figure 5:
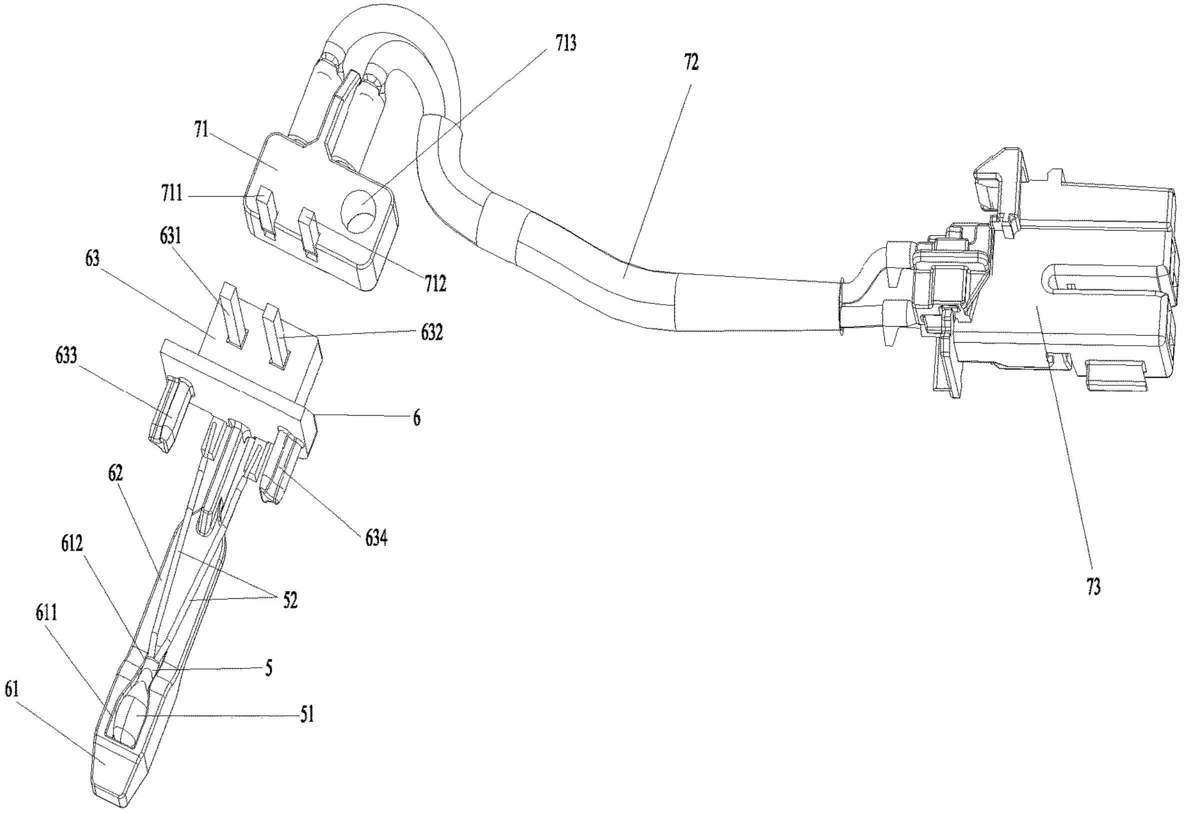
FIG. 5 is a structure diagram of the temperature sensor and flat wires.
Figure 6:
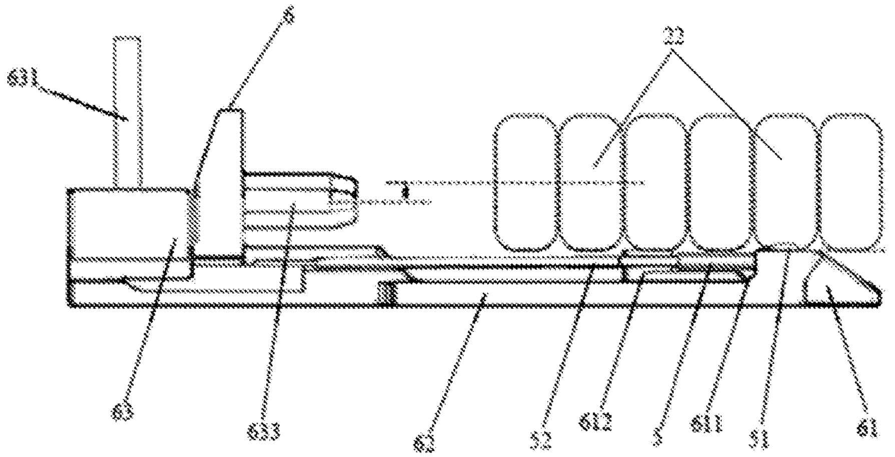
FIG. 6 is a diagram of mounting and cooperation of a sensor mounting assembly to a coil.

In an embodiment, referring to FIGS. 5 and 6, to facilitate assembly of the temperature sensor 5 in the extension channel, the inductor further includes a sensor mounting assembly 6. The mounting assembly 6 is configured to carry the temperature sensor 5 and place the carried temperature sensor 5 into the extension channel and bring the temperature sensor 5 into contact with the inner side face of the coil 2.

In a specific embodiment, the sensor mounting assembly 6 includes a sensor base 61. The sensor base 61 is arranged in the extension channel, and the surface of the sensor base 61 is provided with a recess 611. The recess 611 functions to assemble the temperature sensor 5. In order for the temperature sensor 5 to be securely mounted in the recess 611, a portion of the sensing part 51 of the temperature sensor 5 may be clamped in the recess, while the other portion of the sensing part 51 is exposed from the recess 611 and is in contact with the inner side face of the coil 2. For example, the mounting depth of the sensing part 51 in the recess 611 is less than the height of the sensing part 51 and more than ½ of the height of the sensing part 51, such that the sensing part 51 of a die structure is not liable to escape after being placed in the recess 611.

Further, one side of the sensor base 61 is provided with a conduit or an open port leading to the recess 611, the conduit being a hidden conduit structure leading to the recess 611, and the open port being an open groove structure leading to 611, such as an open port 612 in FIG. 5. Thus, the lead 52 of the temperature sensor 5 is connected to the sensing part 51 in the recess 611 through the conduit or the open port. It may be appreciated that the width of the conduit or the open port on the sensor base 61 should be less than the width of the recess 611 to avoid escaping of the sensing part 51 from the conduit or the open port.

In some cases, the recess 611 on the sensor base 61 may adopt a narrow-top and tight-bottom structure to ensure that the lower portion of the sensing part 51 can be firmly clamped in the recess 611. Of course, some adhesive may also be provided in the recess 611 so as to bond the lower portion of the sensing part 51 into the recess 611. For example, the left and right sides and the head of the recess 611 are enclosed, and the size of its rear narrowed gap is only slightly larger than a wire leading space, and smaller than the spherical diameter of the sensing part 51, so that the temperature sensor 5 is not liable to escape in any direction after being inserted therein.

In a specific embodiment, referring to FIGS. 5 and 6, the sensor mounting assembly 6 comprises not only the sensor base 61, but also a terminal block 63 and an elastic plate 62. The terminal block 63 is arranged at an entrance of the extension channel to convey, by means of a terminal arranged thereon, the temperature signal output by the lead 52 of the temperature sensor 5. One end of the elastic plate 62 is connected to the terminal block 63, and the other end of the elastic plate 62 is connected to the sensor base 61, and the elastic plate 62 is configured to adjust, by deformation thereof, the position of the sensor base 61 relative to the inner side face of the coil 2 so that the sensor base 61 can provide a pressure for the sensing part 51 to be always in contact with the inner side face of the coil 2.

It is to be noted that the elastic plate 62 may be a long thin plate structure with a thin plate thickness of 1/10th or less of a thin plate length of the sensing part 51, so that it can be deformed without breaking when its upper and lower sides are stressed It may be appreciated that the coil is formed by enameled copper wires wound in multiple turns side by side, so there are uneven recesses between the copper wires on the inner side face of the coil. When the sensor base 61 can provide some pressure to the sensing part 51, it can ensure that the sensing part 51 of the temperature sensor 5 is always in contact with the inner side face of the coil, and also ensure that the sensing part 51 can accurately sense and measure the temperature of the coil 2. For example, in FIG. 6, the elastic plate 62 adjusts, by deformation thereof, the position of the sensor base 61 relative to the inner side face of the coil 22, so that the sensor base 61 can provide a pressure for the sensing part 51 to be always in contact with the inner side face of the coil 22, thereby allowing the sensing part 51 of the temperature sensor 5 to be always in contact with the inner side face of the coil 22.

It may be appreciated that here the temperature sensor is arranged inside the inductor in a built-in mode. While accurately measuring the temperature of the inductor coil by using the temperature sensor, the built-in mode also contributes to the properties of resistance to high-intensity mechanical vibration and shock and excellent oil resistance of the temperature sensor, thereby effectively controlling the comprehensive cost of fixing and mounting the temperature sensor on the inductor.

In addition, since the terminal block 63 functions to convey, by means of a terminal arranged thereon, the temperature signal output from the lead 52 of temperature sensor 5, the terminal block 63 should be provided with at least one lead terminal, such as lead terminals 631, 632, as can be seen in FIGS. 5 and 6. Moreover, the lead 52 of the temperature sensor 5 is arranged on the surface of the elastic plate 62, and extends along the elastic plate 62 to the terminal block 63. The lead 52 may include an incoming wire and an outgoing wire, and thus the incoming wire and the outgoing wire may be respectively connected to the lead terminals 631 and 632, wherein one lead terminal provides DC power for the incoming wire and the other lead terminal provides a temperature signal output path for the outgoing wire. It is to be noted that lead terminals 631, 632 are configured to connect an external signal line, thereby transmitting the temperature signal output from the lead 52 to the external signal line.

In an embodiment, referring to FIG. 5, to facilitate external transmission of the temperature signal, the inductor further comprises an external block 71, a signal line 72, and a signal connector 73. The external block 71 is provided with at least one external terminal, such as external terminals 711, 712, the external terminals 711, 712 here being configured to connect the signal line 72; and the external block 71 is detachably connected to the terminal block 63, and the external terminals 711, 712 are electrically connected to the lead terminals 631, 632, e.g. the external terminal 711 and the lead terminal 631 are soldered together, and the external terminal 712 and the lead terminal 632 are soldered together, which can ensure the stability of the electrical connections. Since the temperature signal is very weak, a shielded line may be used as the signal line 72 and thus connected to the signal connector 73. The signal connector 73 be a quick-plug connector to facilitate connection to some communication circuit boards.

Further, the external block 71 is also provided with a through hole 713. The through hole 713 is used to cooperate with a screw or a bolt for the purpose of fixing the external block 71 to the exterior of the inductor, such as fixing the external block 71 to an assembly part 33 of an injection molded body 3.

In an embodiment, referring to FIGS. 1 to 5, the magnetic core 1 is designed as a ring-like structure formed by multiple components spliced together so as to facilitate assembly. Hence, the magnetic core 1 may include two first components (such as denoted reference numerals 11, 12) and a plurality of second components (such as denoted reference numerals 13, 14), wherein the two first components 11, 12 are arranged opposite each other, and the two second components 13, 14 are arranged in two rows side by side between the two first components 11, 12, and all of the first and second components are combined to form the ring-like structure of the magnetic core 1. It is to be noted that the second components 13 and 14 can be used here as the winding parts, respectively, with a coil 21 wound on the second component 13 and a coil 22 wound on the second component 14. It may be appreciated that since the second components 13 and 14 serve as the winding parts, it is possible to either provide a groove on one of the two second components and assemble the temperature sensor 5 therein, or to provide grooves on both the two second components and assemble the temperature sensors 5 therein respectively.

For example, all the first and second components are combined to form the ring-like structure of the magnetic core 1. Specifically, referring to FIG. 5, the first components 11 and 12 have U-shaped openings, and the second components (i.e., 13 and 14) arranged in two rows side by side between the opposite openings of the two first components, thus forming a ring-like arrangement of the first component 11, the second component 14, the first component 12, and the second component 13. Furthermore, referring to FIGS. 4 and 5, the second component 13 is provided with a groove 131, with an extension channel formed between the groove 131 and the coil 21, and the second component 14 is provided with a groove 141, with an extension channel formed between the groove 141 and the coil 22. Hence, it may be appreciated that in one case, the temperature sensor 5 may be arranged in the extension channel formed between the groove 141 and the coil 22, and may also be formed in the extension channel formed between the groove 131 and the coil 21, or even two temperature sensors 5 are deployed, and arranged in different extension channels respectively.

It is to be noted that the outer side faces of each of the second components 13, 14 include one or more geometric surfaces, several of which are provided with grooves, and the extension channel is formed between the grooves here and the inner side face of the coil. Using the magnetic core in FIG. 4 as an example, the second component 14 is a cuboidal structure including six geometrical surfaces, two of which need to be in clearance fit with the opening of the first component 11 and the opening of the second component 12 and do not need a coil, so these two geometrical surfaces may not be provided with grooves, while the remaining four geometrical surfaces are used to wind a coil thereon, and thus one or more grooves may be provided on each of the four geometrical surfaces, respectively.

Furthermore, for the winding part formed by each of the second components 13, 14, the groove on the winding part may extend to outer side faces of the first components. Specifically, referring to FIGS. 3 and 4, the groove 131 on the second component 13 extends to the first components 11, 12 to form grooves on the first components 11, 12, respectively, and the groove 141 on the second component 14 extends to the first components 11, 12 to form grooves on the first components 11, 12, respectively. Hence, after the first components 11, 12 and the second components 13, 14 are spliced together, the grooves formed by extension on all the components form communicated grooves to facilitate insertion of the temperature sensor 5 between the coils and the second components along such grooves.

It is to be noted that for the ring-like structure of the magnetic core 1, to achieve good induction properties and flux density, the material of the magnetic core 1 can be optimally set; for example, the materials of the first components 11, 12 and the second components 13, 14 are all metal powder, and the first components and the second components are made by the compressed powder of the metal powder.

In an embodiment, since the magnetic core 1 is a ring-like structure form by splicing the first component 11, 12 and the second component 13, 14, in order to achieve complete assembly between the components, the inductor device in this embodiment may also include a plurality of fixing brackets (such as denoted by reference numerals 41, 42). Each fixed bracket is fixed around the corresponding first component, and the fixed bracket is provided with clamping components, the inner sides of which clamp the second components and the outer sides of which carry the coils. Referring to FIGS. 1 to 4, the fixing bracket 41 is fixed to the first component 11, and the fixing bracket 41 is provided with clamping components 411, 412, and the fixing bracket 42 is fixed to the first component 12, and the fixing bracket 42 is provided with clamping components 421, 422; hence, the inner side of the clamping component 411 and the inner side of the clamping component 421 respectively carry two ends of the second component 13, and the outer side of the clamping component 411 and the outer side of the clamping component 421 respectively carry two ends of the coil 21, thus achieving fixation of the second component 13 and the coil 21; hence, the inner side of the clamping component 412 and the inner side of the clamping component 422 respectively carry two ends of the second component 14, and the outer side of the clamping component 412 and the outer side of the clamping component 422 respectively carry two ends of the coil 22, thus achieving fixation of the second component 14 and the coil 22.

It is to be noted that, referring to FIGS. 1 to 4, since the fixing bracket 41 can fix the second components 13, 14 on the inner side and fix the coils 21, 22 on the outer side, an injection gap can be formed between the inner side face of the coil 21 and the outer side face of the second component 13, and an injection gap can be formed between the inner side face of the coil 22 and the outer side face of the second component 14. The injection gaps function to fill and inject a plastic melt. Moreover, to ensure a smooth filling effect of the plastic melt in the injection gaps and to meet the requirement that the injection gaps be as narrow as possible, the gap distance of each injection gap can be set in the range of 0.5 to 3 mm.

In an embodiment, for each second component forming the winding part, the groove on the winding part extends to the outer side face of the first component, and an extension entrance is formed between the groove extending on the first component and the fixing bracket fixed around the same, and the extension entrance is communicated with the extension channel. Through the extension entrance, not only can the temperature sensor be inserted into the extension channel, but also a plastic melt can be injected into the extension channel to form an injection molded body. Specifically referring to FIGS. 1 to 4, the groove 141 on the second component 14 extends to the first components 11 to form a groove on the first component 11, and an extension entrance 142 is formed between the groove formed on the first component 11 and the fixing bracket 41, and the temperature sensor 5 can be inserted into the extension channel along the extension entrance 142.

In an embodiment, since the extension entrance 142 is formed between the groove extending to the first component 11 and the fixing bracket 41, and the temperature sensor 5 is carried on the sensor mounting assembly 6, thus the terminal block 63 of the sensor mounting assembly 6 can be fixed to the fixing bracket 41, and the elastic plate 62 of the sensor mounting assembly 6 is introduced from the extension entrance 142 and extends from the terminal block 63 into the extension channel. In this way, the assembly of the sensor mounting assembly 6 and the temperature sensor 5 in the extension channel is accomplished.

In a specific embodiment, to facilitate fixing the terminal block 63 on the fixing bracket 41, at least one hole, such as holes 413, 414, may be provided in the fixing bracket 41, and at least one pin, such as pins 633, 634, may be provided on the terminal block 63. Hence, the pins 633, 634 are connected to the holes 413, 414 by transition fit, respectively, so that the terminal block 63 is fixed to the fixing bracket 41.

For example, the pins 633, 634 may both be columnar pins, and after assembly to the fixing bracket 41, the pins are tightly fitted with the holes, and the pins are always at a relatively stable height with respect to an inner plane of the inductor coil, as can be seen in FIG. 6. In addition, a natural height of an upper side of the sensing part 51 of the temperature sensor 5 is at the same plane height as the inner plane of the coil 22, or slightly above the inner plane height of the coil 22, so that the sensing part 51 is in close contact with the inner side face of the coil 22.

In an embodiment, to facilitate protection and installation of the inductor, the inductor further includes an injection molded body 3. The injection molded body 3 is used to form an integrated molded body with the magnetic core 1, the coil 2, the fixing bracket 4, the temperature sensor 5, and the sensor mounting assembly 6. This integrated molded body can maximally reduce the spatial distance between the coil 2 and the magnetic core 1 to ensure good electrical insulation. The extremely thin insulation distance also improves the outward thermal conductivity of the magnetic core 1, and the dense injection molding effect ensures that the resistance to mechanical vibration and shock of the inductor overall. Of course, in addition to the body filled between the coil 2 and the magnetic core 1, the injection molded body 3 may also include a body wrapped around the outside of the magnetic core 1.

Figure 2:
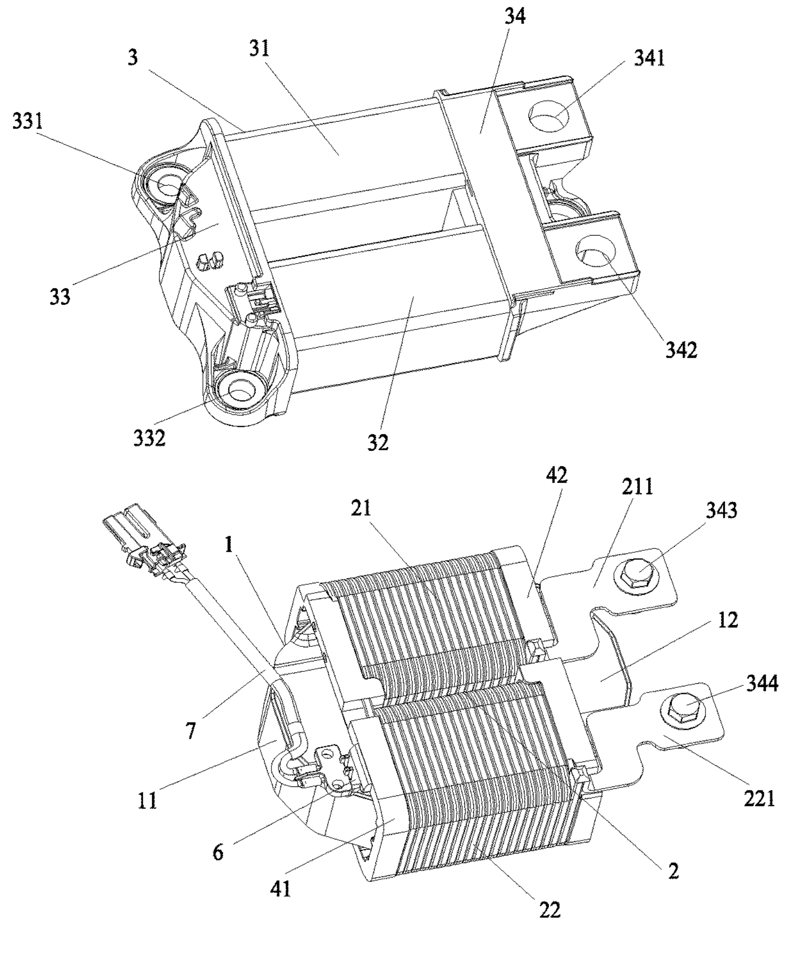
FIG. 2 is a disassembly diagram of the inductor.
Figure 3:
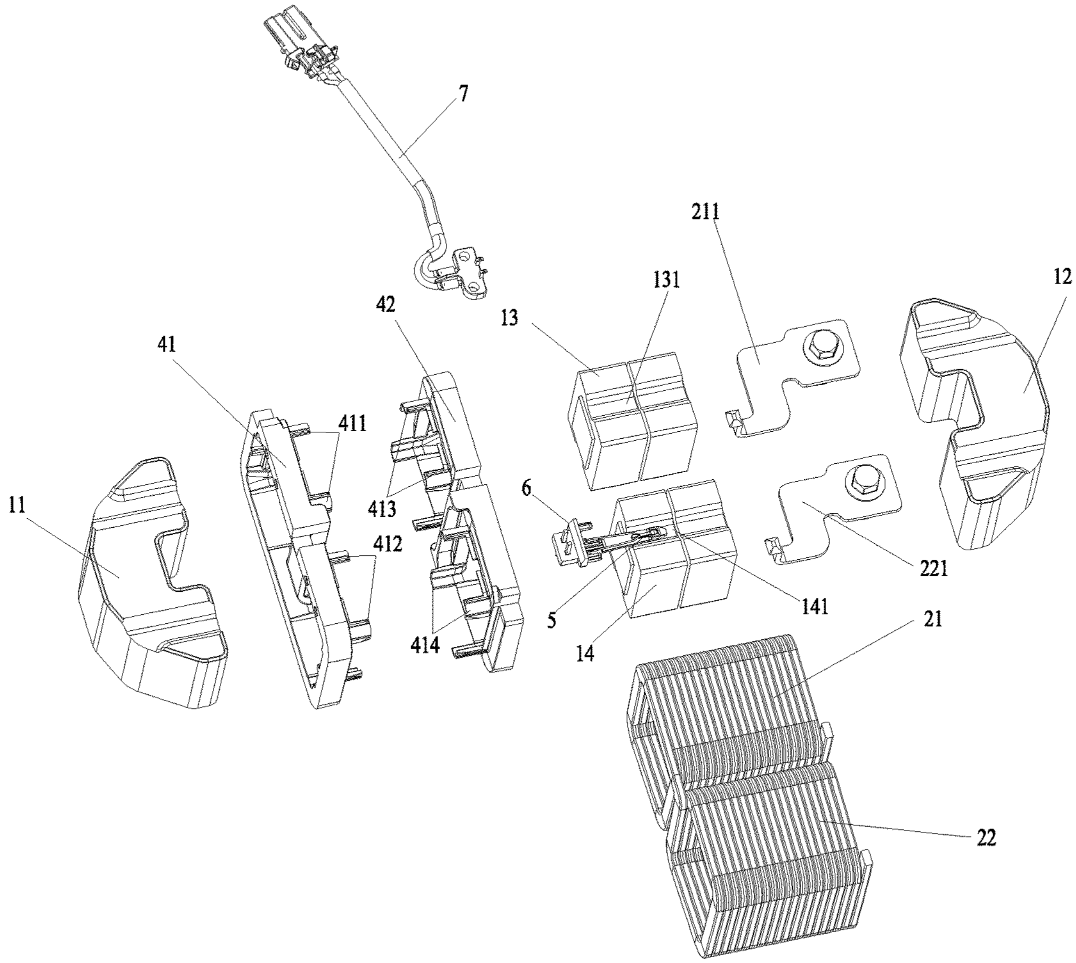
FIG. 3 shows an exploded diagram of the inductor.
Figure 4:
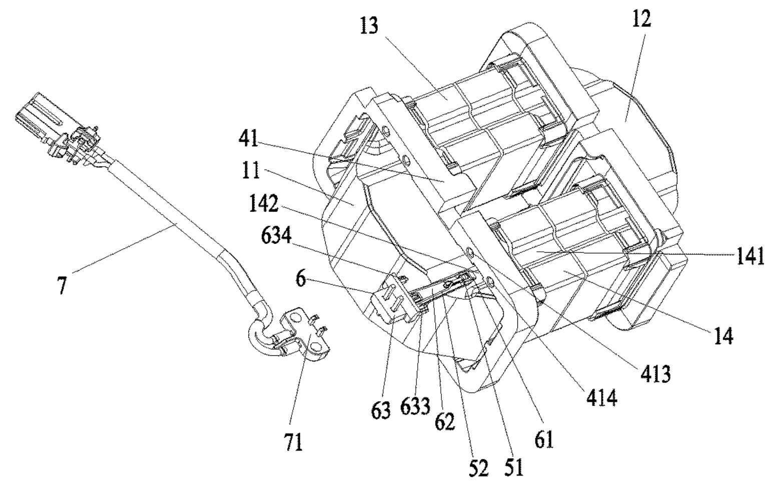
FIG. 4 is an assembly diagram of a temperature sensor and a magnetic core.

For example, in FIGS. 1 to 3, the injection molded body 3 not only fills the gaps between the magnetic core 1 and the coils 21, 22 along the extension channels to form filling parts 31, 32, the filling parts 31, 32 here being the result of filling the extension channels and the injection gaps with the plastic melt; moreover, the injection molded body 3 also wraps the first components 11, 12 to form assembly parts 33, 34 at the peripheries of the first components 11, 12, respectively, the assembly parts 33, 34 here being the result of filling of the plastic melt in an injection mold, and mainly for mounting and fixing the integrated molded body composed of the injection molded body 3, the magnetic core 1 and the coils 21, 22. For example, a plurality of through holes 331, 332 are provided in the assembly parts 33, 34, and all the through holes are used to allow screws or bolts for mounting and fixation to pass through. It may be appreciated that the inductor device can be fixed to some power supply equipment after the screws or bolts are passed through the through holes 331, 332.

Further, referring to FIGS. 1 and 2, the assembly part 34 is further provided with flat wires 211, 221. The flat wire 211 is connected to a terminal at the tail of the coil 21 to introduce or draw DC power to or from the coil 21, and the flat wire 221 is connected to a terminal at the tail of the coil 22 to introduce or draw DC power to or from the coil 22. To fix the flat wires 211, 221, the assembly part 34 may also be provided with a plurality of screw holes 341, 342. The screw holes 341, 342 are used to cooperatively fix the flat wires 211, 221, respectively. Hence, the flat wire 211 can be fixed to the assembly part 34 by cooperation of the screw 343 and the screw hole 341, and the flat wire 221 can be fixed to the assembly part 34 by cooperation of the screw 344 and the screw hole 342.

It is to be noted that high-power inductor devices mainly use an oil-cooling or water-cooling mode for heat dissipation from components to reduce the volume and cost, while in the design of the inductor in the technical solution of present application, after injection molding of the inductor is completed, the outer surface of the coil as the part that generates most heat needs to be fully exposed. Heat dissipation by external conduction through the exposed coil surface is one of the most effective ways of improving heat dissipation of the inductor and reducing the size of the inductor. It may be appreciated that, in order to achieve the exposure of the coil, an integrally formed plastic injection port needs to be provided on one or both sides of the inductor coil, and depending on the requirements of different products, the injection port may be used for plastic injection on one side or on the left and right sides; and the magnetic core, the coil, the temperature sensor, and the sensor mounting assembly are assembled by means of the fixing brackets on both sides of the coil and placed into the injection mold beforehand. Hence, during injection molding, the high-temperature PPS plastic melt is injected from the injection port on the outer side of the coil fixing bracket, and flows rapidly along the injection channel on the inner side of the coil, and fills the gap between the magnetic core and the coil, thus accomplishing the integrally injection molding process.

It may be appreciated that the technical solution uses a built-in mode for placing the sensor element inside the inductor and bringing it into close contact with the inner side face of the coil, which greatly improves the accuracy of temperature measurement, and allows the sensor to be stably contained therein by an integrally injection molding process, thus achieving the positive effects of a low cost, high reliability, high accuracy, fast response and high product quality.

The present application is described above by using specific examples, which are only used to facilitate understanding the technical solution of the present application, and are not intended to limit the present application. For those skilled in the art, a number of simple derivations, variations or substitutions can be made based on the ideas of the present application.

The invention claimed is:

1. An inductor with temperature detection, comprising a magnetic core, coils and a temperature sensor, wherein the magnetic core is a ring-like structure and is provided with two winding parts, at least one of the winding parts being provided with a groove;

the coils are wound on the winding parts, and an extension channel is formed between an inner side face of the coil and the groove on the winding part;

the temperature sensor comprises a sensing part and a lead, the temperature sensor being arranged in the extension channel;

wherein the sensing part is in contact with the inner side face of the coil to sense the temperature of the coil to generate a temperature signal; and the lead is connected to the sensing part and arranged along the extension channel to output the temperature signal;

further comprising a sensor base, wherein the sensor base is located in the extension channel, and the surface of the sensor base is provided with a recess; and a portion of the sensing part is clamped in the recess, while the other portion of the sensing part is exposed from the recess and is in contact with the inner side face of the coil;

further comprising a terminal block and an elastic plate, wherein the terminal block is arranged at an entrance of the extension channel;

one end of the elastic plate is connected to the terminal block, and the other end of the elastic plate is connected to the sensor base; and the elastic plate is configured to adjust, by deformation thereof, the position of the sensor base relative to the inner side face of the coil so that the sensor base provides a pressure for the sensing part to be always in contact with the inner side face of the coil.

2. The inductor according to claim 1, wherein one side of the sensor base is provided with a conduit or an open port leading to the recess, and the lead is connected through the conduit or the open port to the sensing part in the recess; and the width of the conduit or the open port is less than the width of the recess to avoid escaping of the sensing part from the conduit or the open port.

3. The inductor according to claim 1, wherein the terminal block is provided with at least one lead terminal;

the lead is arranged on the surface of the elastic plate, and extends along the elastic plate to the terminal block, and the lead is connected to the lead terminal; and the lead terminal is configured to connect an external signal line to transmit the temperature signal to the signal line.

4. The inductor according to claim 3, further comprising an external block, the external block being provided with at least one external terminal configured to connect the signal line; and the external block is detachably connected to the terminal block, and the external terminal is electrically connected to the lead terminal.

5. The inductor according to claim 1, wherein the magnetic core comprises two first components and a plurality of second components;

the two first components are arranged opposite each other, and the two second components are arranged in two rows side by side between the two first components, and all of the first and second components are combined to form the ring-like structure of the magnetic core; and outer side faces of the second components are used as the winding parts.

6. The inductor according to claim 5, further comprising a plurality of fixing brackets, wherein the fixing brackets are fixed around the first components;

each fixing bracket is provided with clamping components, the inner sides of which clamp the second components and the outer sides of which carry the coils; and the terminal block is fixed to the fixing bracket, and the elastic plate extends from the terminal block into the extension channel.

7. The inductor according to claim 6, wherein the fixing bracket is provided with at least one hole, and the terminal block is provided with at least one pin; and the pin is in transition fit with the hole so that the terminal block is fixed to the fixing bracket.

8. The inductor according to claim 6, further comprising an injection molded body, wherein injection gaps are formed between the inner side faces of the coils and the outer side faces of the second components, the injection gaps being communicated with the extension channel; and the injection molded body extends along the extension channel to the surrounding injection gaps and fills the extension channel and the injection gaps.

9. The inductor according to claim 6, wherein the injection molded body wraps the first components, and assembly parts are formed at the peripheries of the first components; and the assembly parts are configured to mount and fix an integrated molded body composed of the injection molded body, the magnetic core and the coil.

10. The inductor according to claim 9, wherein the assembly part is provided with flat wires, which are connected to terminals at the tails of the coils to introduce or draw DC power to or from the coils.

* * * * *